United States Patent
Shanbhag et al.

(10) Patent No.: US 10,776,188 B2
(45) Date of Patent: Sep. 15, 2020

(54) METHOD AND APPARATUS FOR GENERATING WORKFLOW

(71) Applicant: SAMSUNG ELECTRONICS CO., LTD., Suwon-si (KR)

(72) Inventors: Amogha D. Shanbhag, Karnataka (IN); Ashok Babu Channa, Karnataka (IN); Mainak Choudhury, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 15/991,557

(22) Filed: May 29, 2018

(65) Prior Publication Data
US 2018/0341533 A1    Nov. 29, 2018

(30) Foreign Application Priority Data

May 29, 2017 (IN) .............................. 201741018861
Jan. 22, 2018 (IN) .............................. 201741018861

(51) Int. Cl.
| | | |
|---|---|---|
| G06F 9/54 | (2006.01) | |
| G06F 9/48 | (2006.01) | |
| G06F 16/33 | (2019.01) | |
| G06Q 10/06 | (2012.01) | |
| G06Q 10/10 | (2012.01) | |

(52) U.S. Cl.
CPC ............ *G06F 9/543* (2013.01); *G06F 9/4843* (2013.01); *G06F 9/542* (2013.01); *G06F 16/3334* (2019.01); *G06Q 10/06316* (2013.01); *G06Q 10/10* (2013.01)

(58) Field of Classification Search
None
See application file for complete search history.

(56) References Cited

U.S. PATENT DOCUMENTS

| 6,442,528 B1 | 8/2002 | Notani et al. |
| 6,458,081 B1 | 10/2002 | Matsui et al. |
| (Continued) | | |

FOREIGN PATENT DOCUMENTS

| CN | 104765608 A | 7/2015 |
| KR | 10-2010-0099447 A | 9/2010 |
| (Continued) | | |

OTHER PUBLICATIONS

Communication dated Sep. 13, 2018 issued by the International Searching Authority in Counterpart Application No. PCT/KR2018/006097 (PCT/ISA/220, PCT/ISA/210, and PCT/ISA/237).
(Continued)

*Primary Examiner* — Craig C Dorais
(74) *Attorney, Agent, or Firm* — Sughrue Mion, PLLC

(57) ABSTRACT

A method and an apparatus for enhancing user experience while performing an event using a plurality of devices connected to each other is provided. The method includes analyzing an event extracted from an input received by the device, identifying the at least one task to be performed based on the analyzing of the event, generating a workflow corresponding to the identified at least one task, selecting at least one node of the workflow corresponding to the generated workflow, and performing an action, by an application installed in or connected to the device, in response to a the selection of at least one node of the workflow.

18 Claims, 18 Drawing Sheets

(56) References Cited

U.S. PATENT DOCUMENTS

| | | | |
|---|---|---|---|
| 7,100,147 B2 | 8/2006 | Miller et al. | |
| 2003/0018512 A1* | 1/2003 | Dortmans | G06Q 10/06 718/100 |
| 2010/0211420 A1 | 8/2010 | Kodi et al. | |
| 2011/0283296 A1 | 11/2011 | Chun | |
| 2011/0320977 A1 | 12/2011 | Bahn et al. | |
| 2014/0215367 A1 | 7/2014 | Kim et al. | |
| 2014/0330659 A1 | 11/2014 | Yopp et al. | |
| 2014/0337071 A1 | 11/2014 | Stiffler et al. | |
| 2014/0344004 A1* | 11/2014 | Surendran | G06Q 10/06316 705/7.26 |
| 2016/0232491 A1 | 8/2016 | Nalsky | |
| 2017/0123653 A1 | 5/2017 | Harada et al. | |

FOREIGN PATENT DOCUMENTS

| | | |
|---|---|---|
| KR | 10-2012-0070048 A | 6/2012 |
| KR | 20170006120 A | 1/2017 |
| WO | 0243304 A2 | 5/2002 |
| WO | 02043304 A3 | 5/2002 |

OTHER PUBLICATIONS

Extended European Search Report dated Mar. 31, 2020 issued in European Patent Application No. 18810428.5.

* cited by examiner

Multiple applications generate notifications in a random order

Multiple tasks to be performed by multiple devices in a random order

METHOD AND APPARATUS FOR GENERATING WORKFLOW

CROSS REFERENCE TO RELATED APPLICATIONS

This application is based on and claims priority under 35 U.S.C. § 119(a) to Indian Provisional Patent Application No. 201741018861, filed on May 29, 2017 in the Indian Patent Office, and to Indian Patent Application No. 201741018861 filed on Jan. 22, 2018 in the Indian Patent Office, the disclosure of each of which is incorporated by reference herein in its entirety.

BACKGROUND

1. Field

The disclosure relates to the usability of user interface in devices in a connected environment comprising Internet of Things (IoT) and non-IoT devices and services, and not limiting to any other connected devices and services. More particularly, the disclosure relates to methods and apparatus for enhancing user experience in performing an event by generating a dynamic workflow of tasks.

2. Description of Related Art

IoT devices or electronic devices perform one or more tasks according to a context, where the context is analyzed based on an input data received by the electronic devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for enhancing user experiences in performing an event by generating a dynamic workflow of tasks.

Additional aspects will be set forth in part in the description which follows and, in part, will be apparent from the description, or may be learned by practice of the presented embodiments.

In accordance with an aspect of the disclosure there is provided a method of generating a workflow of at least one task by a device, the method including determining an event corresponding to an input received by the device, identifying the at least one task to be performed based on the determining of the event, generating a workflow corresponding to the identified at least one task, the generated workflow including at least one node of the workflow, receiving a selection by a user of the at least one node of the workflow, and performing an action, by an application installed in or connected to the device, based on the selection of at least one node of the workflow.

The method may further include displaying the at least one node of the workflow on a display of the device.

The performing the action may include displaying at least two sub-nodes included in the at least one node of the workflow in response to the selection of the at least one node of the workflow, and performing a sub-action based on a selection of at least one sub-node among the at least two sub-notes.

The method may further include rearranging the workflow based on at least one of the user's input to add, delete, and change an order of the at least one node of workflow.

The performing of the action may include performing a different action on a periodic basis.

The method may further include receiving an initiation input for the workflow by the user, and performing the action corresponding to the workflow sequentially based on the initiation input for the workflow.

The input may include at least one of a voice input, a text message in the device, a text message transmitted from outside of the device, and a notification in the device.

The at least one task may be selected from outside of the device.

The identifying of the at least one task may include determining the at least one task based on at least one of a keyword extracted from the input, the event, and a location information, and searching applications corresponding to the determined task from at least one of a database stored in the device and network servers outside the device.

The method may further include displaying at least one notification corresponding to the action based on the selection of the at least one node of the workflow.

In accordance with an aspect of the disclosure there is provided an apparatus for generating a workflow of at least one task, the apparatus including at least one processor configured to determine an event extracted from an input of a user, identify the at least one task to be performed based on the determined event, generate a workflow corresponding to the identified at least one task, the generated workflow including at least one node of the workflow, receive a selection by the user of the at least one node of the workflow, and perform an action, with an application installed in or connected to the apparatus, based on to the selection of at least one node of the workflow.

The apparatus may further include a display configured to display the at least one node of the workflow.

The display may be further configured to display at least two sub-nodes included in the at least one node of the workflow based the selection of the at least one node of the workflow, and wherein the performing of the action includes performing a sub-action based on a selection of at least one sub-node among the at least two sub-notes.

The at least one processor may be further configured to rearrange the workflow based on at least one of user's input to add, delete, and change an order of at least one node of the workflow.

The performing of the action includes performing a different action on a periodic basis.

The at least one processor may be further configured to receive an initiation input for the workflow by the user, and perform the action corresponding to the workflow sequentially based on the initiation input for the workflow.

The input may include at least one of a voice input, a text message input in the device, a text message transmitted from outside the device, and a notification in the device.

The identifying of the at least one task may include determining the at least one task based on at least one of a keyword extracted from the input, the event, and a location information, and searching applications corresponding to the determined task from at least one of a database stored in the apparatus and network servers outside of the apparatus.

The display may be further configured to display at least one notification corresponding to the action based on the selection of the at least one node of the workflow.

In accordance with an aspect of the disclosure there is provided a non-transitory computer program product including a computer readable storage medium having a computer readable program stored therein, the computer readable program, when executed on a device, configured to execute instructions to cause the device to analyze an event extracted from an input received by the device, identify at least one task to be performed based on the analyzing of the event, generate a workflow corresponding to the identified at least one task, the generated workflow including at least one node of the workflow, receive a selection of the at least one node of the workflow, and perform an action, by an application installed in or connected to the device, based on the selection of at least one node of the workflow.

The at least one processor may be further configured to add or delete the at least one node of the workflow based on a swipe input.

The at least one processor may be further configured to display information corresponding to a node of the workflow based on a hover input, and to execute the task in response to a click input.

In accordance with an aspect of the disclosure there is provided a method of generating a workflow of an event by a device, the method including determining the event corresponding to an input received by the device, identifying a plurality of tasks to be performed based on the determining of the event, generating a workflow based on the identified plurality of tasks, the generated workflow including a plurality of nodes of the workflow corresponding to the plurality of tasks, respectively, displaying the plurality of nodes of the workflow on a display of the device, receiving a selection by a user of at least one of the displayed plurality of nodes of the workflow, and performing at least one task, by an application installed in or connected to the device, corresponding to the selected at least of the plurality of nodes of the workflow.

The method may further include receiving an initiation input for the workflow by the user, and performing the plurality of tasks corresponding to the plurality of nodes of the workflow sequentially or in parallel based on the initiation input for the workflow.

The method, wherein a progress of the plurality of tasks may be displayed based on a color of each of the plurality of nodes of the workflow.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
FIG. 1 illustrates generation of a plurality of notifications from different applications to perform a plurality of tasks according to an embodiment.
Figure 1:
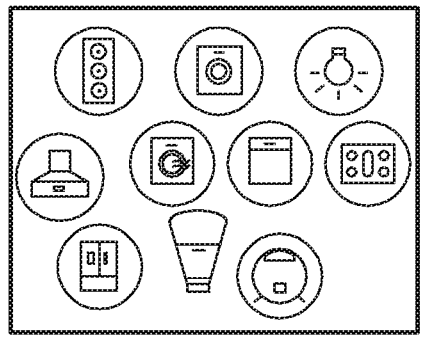

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the disclosure.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

As used herein, the terms "1st" or "first" and "2nd" or "second" may use corresponding components regardless of importance or order and are used to distinguish one component from another without limiting the components.

The terms "include" and "comprise," as well as derivatives thereof, mean inclusion without limitation. The term of "and/or" includes a plurality of combinations of relevant items or any one item among a plurality of relevant items.

The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Moreover, various functions described below may be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

In an example, a user may provide a command, i.e., the input data, using voice to a smartphone (an IoT device or smart electronic device) to perform a task. The smartphone may also receive a command through a message from another user to perform the task. If the command is, for example, "I am hungry", then the smartphone, in response to the command, may perform the task of displaying a list of restaurants nearby, so that the user may order some food based on the received context of the command. In another example, a user may receive another text message in the smartphone, which is "watch television series". The text message is analyzed and the smartphone may perform the task to turn on a TV, which may be a connected smart television. However, there may be a limitation in performing tasks assigned through commands, which may require performing multiple actions in sequence and/or in parallel.

In addition, there may be a task including performing sub-tasks, which may not be directly related to the performed task. In such scenarios, the user may have to access multiple devices to perform the task, where at least one sub-task may be performed in at least one of the multiple devices. There may arise situations where the user may forget to perform the at least one sub-task. For example, the user may book a vacation using an application on a smartphone and the user may need to set a smart refrigerator to a power saving mode, using the smartphone, prior to leaving for vacation. The user may not remember to perform the two sub-tasks using the two devices, for example, the smartphone and the smart refrigerator.

FIG. 1 illustrates generation of a plurality of notifications from different applications to perform a plurality of tasks, by a plurality of connected devices in a random order. A user may plan to accomplish an objective or perform an activity, for which a plurality of tasks may need to be performed. Performing the tasks may involve multiple devices, which are connected to each other (wired or wireless), which may require multiple interactions. For example, the objective of the user is to plan a vacation. Achieving this objective may involve a plurality of interactions or tasks, such as confirming flight tickets, locking the doors, enabling security surveillance, arranging a robot-cleaner for cleaning, setting the refrigerator in power saving mode, turning on the heater or A/C when the user returns home, setting a reminder to prepare food with available grocery, ordering or postponing some grocery or home needs based on non-availability, etc. These tasks may require performance of a plurality of devices or services, which generate notifications and perform the activities in a random order. The plurality of devices or services may perform the plurality of tasks in a random order because the user may need to trigger each of the plurality of devices or services separately to perform each task, which may cause an inconvenience to the user.

Further, in some scenarios, there may be some optional steps, which are indirectly related to a task, such as ordering food when food is not available on the user's way home. The user may not remember all tasks that need to be performed. Also, the user may be provided with lots of information such as a plurality of steps to perform, a plurality of notifications, a plurality of reminders, etc. For example, notifications from installed applications, payment reminders, and notifications from the IoT devices, for completed current tasks, pending tasks and error warnings may be provided to the user. A user may not complete all tasks to achieve the user's objective.

Embodiments herein disclose methods and systems to enhance a user experience while performing an event using a plurality of devices in a connected environment, by generating a dynamic workflow of tasks. The embodiments herein enhance the user experience while the user performs an event. The event may require performing at least one task. The generated dynamic workflow may include at least one workflow node representing at least one task, wherein the at least one task may be performed across at least one device in a connected environment. In an example, a plurality of devices may be connected to an Internet of Things (IoT) environment. The at least one task represented by at least one workflow node may be intelligently selected to perform the event. The at least one workflow node may be displayed in the at least one device in the connected environment through at least one object. The workflow may be displayed in a graphical user interface of the at least one device through at least one object. The objects may be triggered by an input to begin execution of the at least one task. The progress of the at least one task may be indicated by varying color of the at least one object.

According to an embodiment, a method of generating a workflow of at least one task by a device is provided. The method includes analyzing an event extracted from an input received by the device, identifying the at least one task to be performed based on the analyzing the event, generating a workflow corresponding to the at least one task, and performing an action, by an application installed in or connected to the device, in response to a selection of at least one node of the workflow.

The at least one node of the workflow may be displayed on a display of the device.

At least two sub-nodes of the at least one node of the workflow may be displayed in response to the selection of the at least one node of the workflow, and a sub-action may be performed in response to a selection of at least one sub-node among the at least two sub-notes.

The workflow may be rearranged based on at least one of user's input to add, delete, or change the order of at least one node.

The performing of the action may include performing the action differently on a periodic basis.

An initiation input for the workflow may be received by the user, and all actions corresponding to the workflow may be performed in sequence in response to the initiation input for the workflow.

The input may include at least one of a voice input, a text message stored in the device or transmitted from outside the device, or a notification in the device.

The identifying of the at least one task may include determining the at least one task based on at least one of a keyword extracted from the input, the event, and a location information of the device, and searching applications corresponding to the determined task for database of the device or network platforms outside the device.

At least one notification related to the action may be displayed in response to the selection of the at least one node of the workflow.

According to an embodiment, an apparatus for generating a workflow of at least one task is provided. The apparatus includes a processor configured to execute instructions to analyze an event extracted from an input of a user, identify at least one task to be performed based on the analyzing of the event, generate a workflow corresponding to the at least one task, and perform an action, with an application installed in or connected to the apparatus, in response to a selection of at least one node of the workflow.

Figure 2:
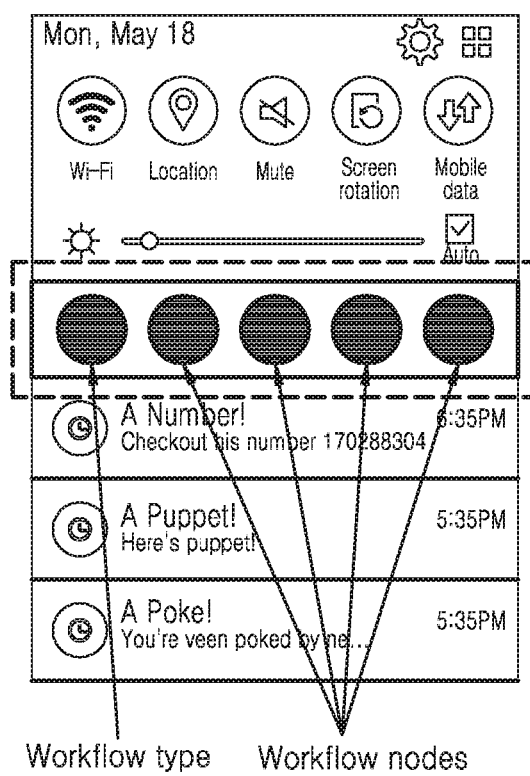
FIG. 2 illustrates a generated workflow of tasks to be performed by a user using at least one connected device in order to perform an event according to an embodiment.

FIG. 2 illustrates a generated intelligent workflow of tasks to be performed by a user using a single device or a plurality of devices, in a connected environment, in order to perform an event according to embodiments. The devices may be include, for example, a smartphone, a laptop, a tablet, a smartwatch, a camera, a smart refrigerator, an air conditioner, a smart locker, a heater, a smart cleaner, etc. For example, the devices may be connected to each other in an IoT environment. If the device is included in an IoT environment, the device may be referred to as an IoT device.

The embodiments allow the user to trigger the event by providing an input command to a device in the connected environment. The input command may be provided by a user to the device using, for example, a voice input, in order to trigger the event to be performed. According to an embodiment, the smartphone may obtain an input command such as notifications from the smartphone itself, which may be stored in the memory. In another example, the smartphone may obtain the input command from a text message stored in the smartphone to trigger the event.

The device included in the connected environment may obtain the input command from another device/entity, using at least one communication interface, such as a text message, e-mail, calendar notification, etc. The event may require performing at least one task. The embodiments include generating a workflow, which includes at least one workflow node. Each of the at least one workflow node may, in response to a selection of the at least one workflow node by a user, perform the at least one task corresponding to the node. The input command may initiate generation of the workflow. Referring to FIG. 2, the first node on the left specifies the type of workflow, and each of the remaining workflow nodes may be used to perform at least one specific task to process the event. The last node on the right may allow the user to add another workflow node to perform an action related to the event based on user's choice.

The input command may include voice commands, event information from a text message, etc. The at least one task associated with the workflow may include independent tasks, dependent tasks, events such as, for example, attending a party, attending a wedding, cleaning, food ordering, car booking, ordering gifts, etc.

According to an embodiment, a processor of a mobile device such as a smartphone may analyze the event information which may be extracted from the input command. For example, the user may tell the smartphone "I want to go home," and the processor of the smartphone may extract some keywords such as "go" and "home". The processor may then interpret the intent of the user based on the extracted keywords, and identify at least one task, for example, a task to guide the user to go home effectively and efficiently. The processor may then link the extracted keywords to appropriate applications.

For example, when the user tells the smartphone "I want to go home," the processor may interpret the intent of the user is to change his or her location from the current position to the user's house, the processor may search the application database of the smartphone for an application such as GPS application, a map application, a public transportation guide application, etc., to achieve the intended task of "going home". According to an embodiment, the smartphone may respond to the input to obtain more information to link an application with higher correspondence to the identified task. For example, the smartphone may inquire whether the user wants to drive the user's own vehicle or use public transportations by displaying "Do you want to drive your own car or use public transportations?" on a user interface. The user may make an input, in response to the aforementioned query generated by the smartphone, by inputting "I will drive my own car" by, for example, voice or text. The smartphone may then exclude the public transportation guide application from the workflow.

Once the task to be performed is identified and determined, the smartphone may generate a workflow corresponding to the identified task.

The embodiments may include representing the workflow of tasks as objects, such as workflow nodes. The objects may be triggered by a user input to execute the corresponding tasks. In response to at least one of the objects being triggered, the tasks may be performed to process the event. The progress of a task may be indicated by color of an object.

Triggering the objects, which represent the workflow nodes, actions may be performed with applications stored in the smartphone or executable via communication networks.

Figure 3:
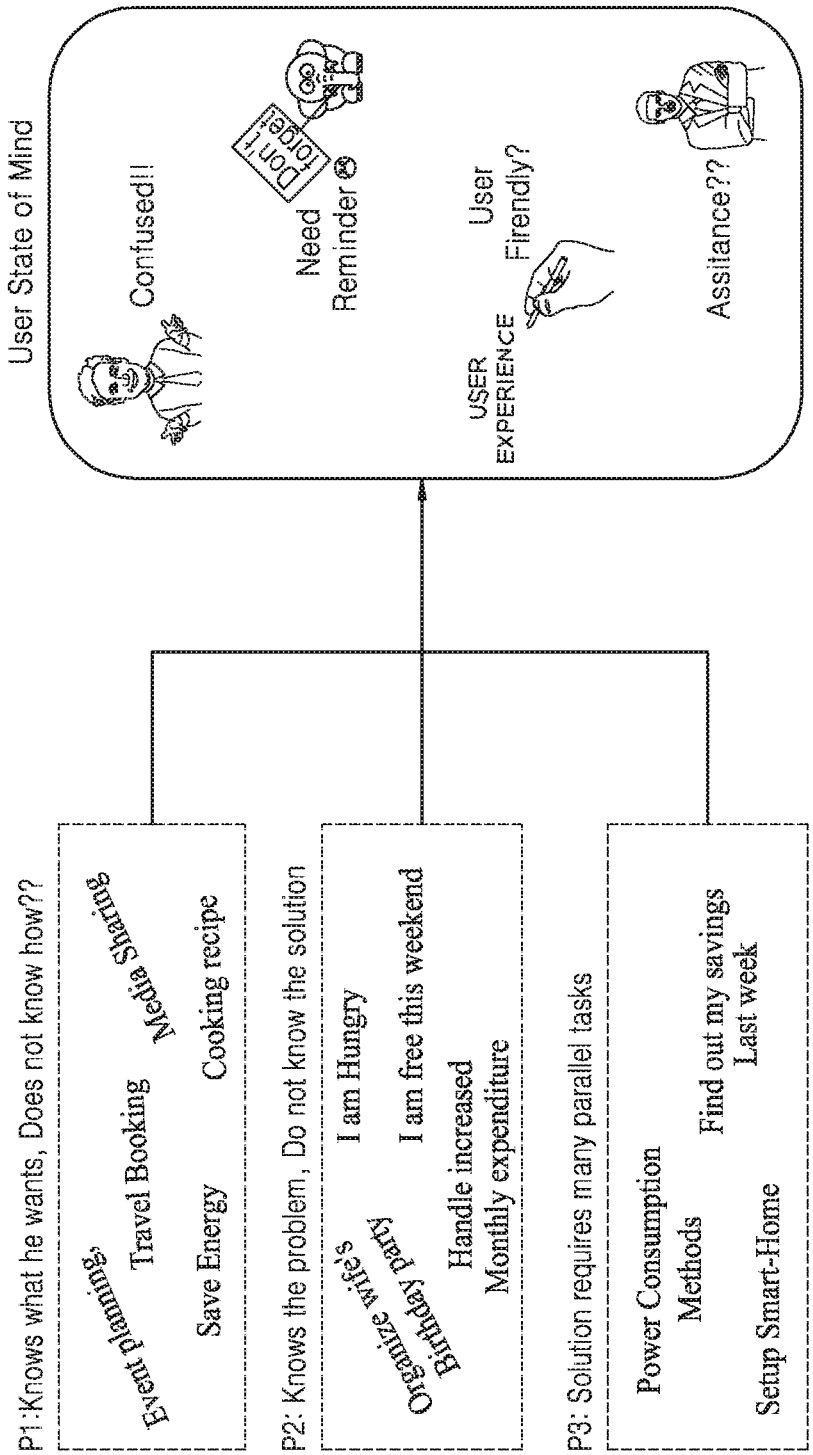
FIG. 3 illustrates an example categorization of at least one task, for performing an event, into a type of problem to be solved according to an embodiment.

FIG. 3 illustrates an example categorization of at least one task, for performing an event, into a type of problem to be solved according to embodiments. In order to process the event, the at least one task needs to be completed. Generally, user device/services are capable of performing partial tasks but when a user wants to perform a larger scale task, it may be more difficult for the user to make or arrange a more efficient and/or effective plan. Also it may be difficult to utilize available devices/services in a more efficient way and track through a more intuitive interface.

Referring to FIG. 3, the at least one task for performing an event may be categorized into a type of problem to be solved. In an embodiment, the event may be categorized into one of a pre-defined type of problem. In one of the problems, the objective may be known but the means to achieve the objective may be unknown (P1). Examples of the objectives may be, but not limited to, travel booking, saving energy, media sharing, cooking recipe, etc. For another problem, the problem may be known but the solution to the problem may be unknown (P2). Examples of the objectives may be, but not limited to, organizing a party, planning for a weekend, ordering food, handling expenditure, etc. In another problem, the solution of the problem for achieving an objective may require performing a plurality of tasks in sequence or in parallel (P3). Examples of the solutions or objectives may be, but not limited to, determining methods to minimize power consumption or save power, set up a smart home, determine savings of a previous week, etc.

A user faced with such problems while trying to perform the event may be confused while planning and executing the at least one task. The user may also require reminders, in case a task to be performed is forgotten. In such circumstances, the embodiments may improve a user experience in performing the event by generating a workflow comprising at least one task to perform the event. The solutions for each type of problem as illustrated in P1, P2, and P3 of FIG. 3 will be discussed with an example in the following drawings.

Figure 4:
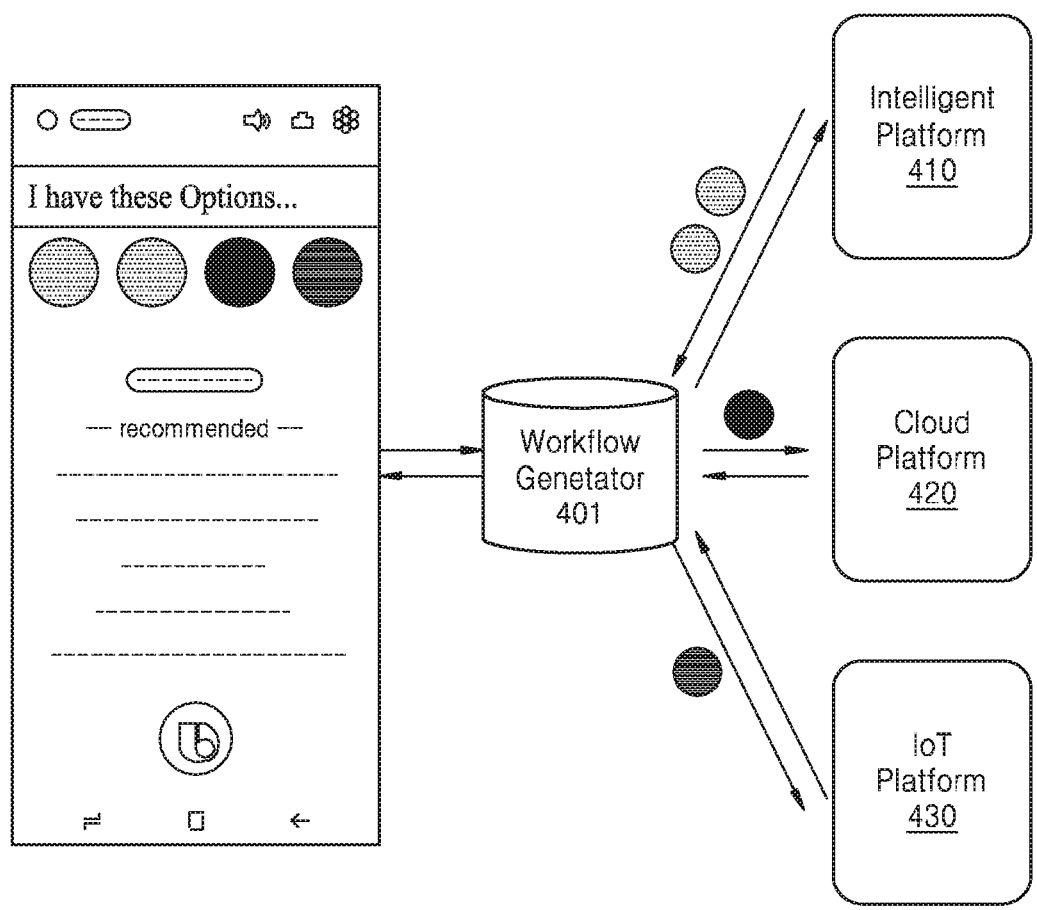
FIG. 4 illustrates an example generation of a workflow from a plurality of modules according to an embodiment.

FIG. 4 illustrates an example generation of a workflow from a plurality of modules according to embodiments. The workflow is generated based on an input command. A user may provide the input command by, for instance, a touch input, voice, text inputs obtained from messages sent by other users, received from another device, etc. The command is for an event or collections of dependent or independent tasks, which requires to be performed. In order to perform the event, at least one task may be involved. As illustrated in FIG. 4, a workflow generator 401 includes selecting the at least one task from a plurality of modules. In an embodiment, the modules may be an intelligent platform 410, a cloud platform 420, and an IoT platform 430. The IoT platform 430 may include tasks which involve IoT operations to be performed using the connected devices and services. The cloud platform 420 may include tasks to be performed on services hosted on different cloud solutions. The intelligent platform 410 may provide the analytics, which may be used to address the input command in order to extract information from the input command.

In all the modules, the workflow generator 401 performs a decision to select the required and intended tasks which are relevant to perform the event based on the input command. The workflow generator 401 may be dependent on the other platforms for selecting tasks. The selected tasks may be displayed on at least one of the connected devices. The decision to select the tasks by the workflow generator 401 may be based on user personalization and IoT persona concerning that of the user or system.

Referring to FIG. 4, the workflow generator 401 includes two tasks from the intelligent platform 410, one task from the cloud platform 420 and one task from the IoT platform 430. The inclusion of tasks from each of the modules is based on a decision, on which task is relevant to the input query. The workflow generator 401 generates the workflow with workflow nodes. For example, when there are four tasks, four workflow nodes represent four tasks. The workflow generator 401 may select two tasks from the intelligent platform 410, one task from the cloud platform 420, and one task from the IoT platform 430.

Figure 5:
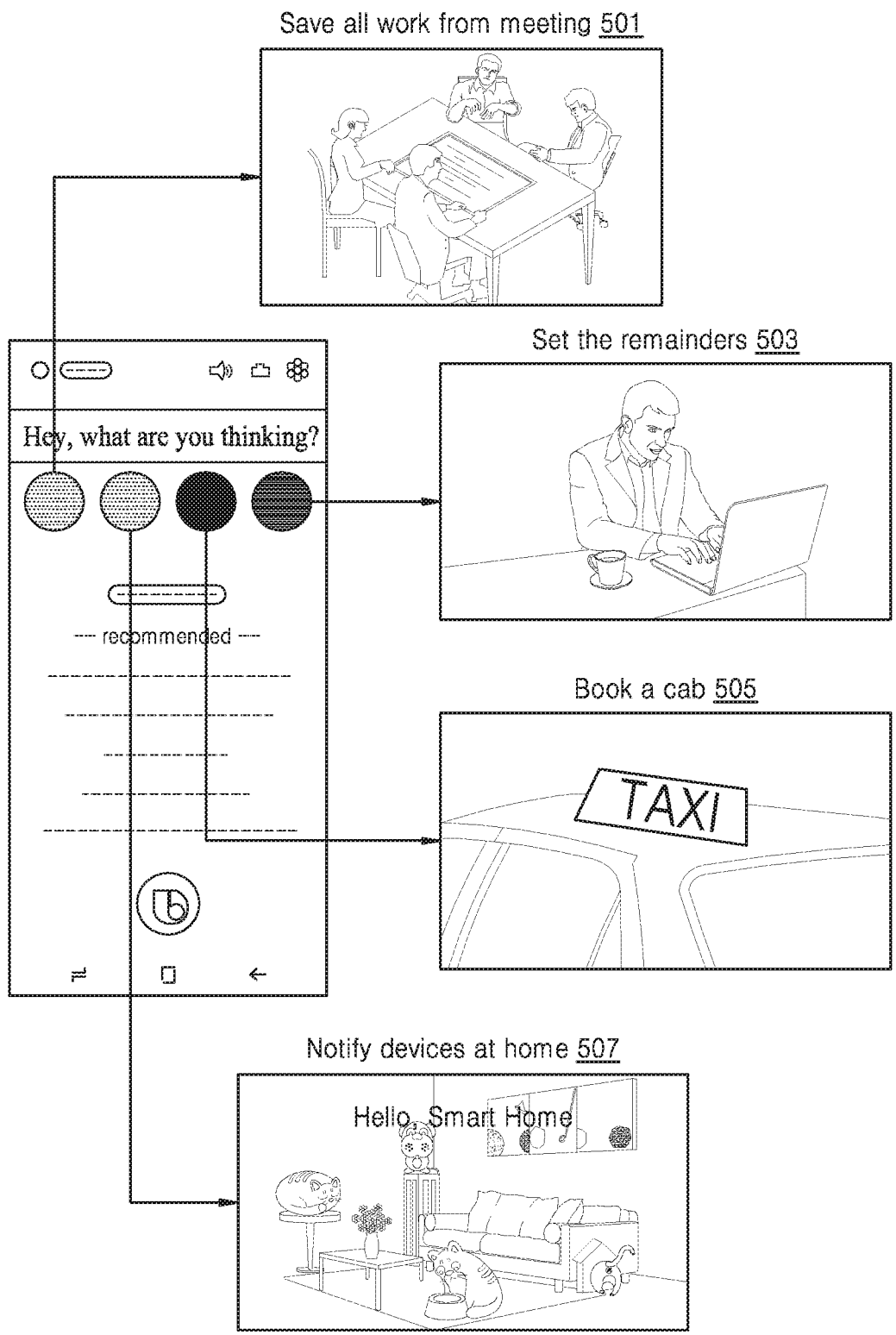
FIG. 5 illustrates an example scenario of solving a problem in which an objective is known but the means to achieve the objective is unknown according to an embodiment.

FIG. 5 illustrates a use-case scenario of solving a problem in which an objective is known but the means to achieve the objective is unknown as illustrated in P1 of FIG. 3 according to an embodiment. In an example, a user may need to accomplish an objective, which is to go home from the office. The objective may be input by the user to an electronic device such as a smartphone. Thus, the event to be performed is 'going home from office'. The user knows the objective. The plurality of tasks to achieve the objective may include saving all work from a meeting 501, setting reminders 503 to carry out certain work later which may be forgotten, booking a cab 505 with best route where the best route may be the road with the shortest distance from the office to the home, with the least traffic, and notifying devices installed at home 507, for example, turning on an air conditioner prior to an arrival of the user at home, controlling a smart refrigerator switching from a power save mode to a normal mode, turning on a robot cleaner for cleaning rooms etc. The embodiments may include generating a workflow, which comprises four workflow nodes. Each workflow node represents a task which may involve an application which may be installed in the smartphone to perform the task. The workflow nodes, when selected by the user, trigger the respective tasks, which when performed may allow the user to achieve the objective.

Figure 6:
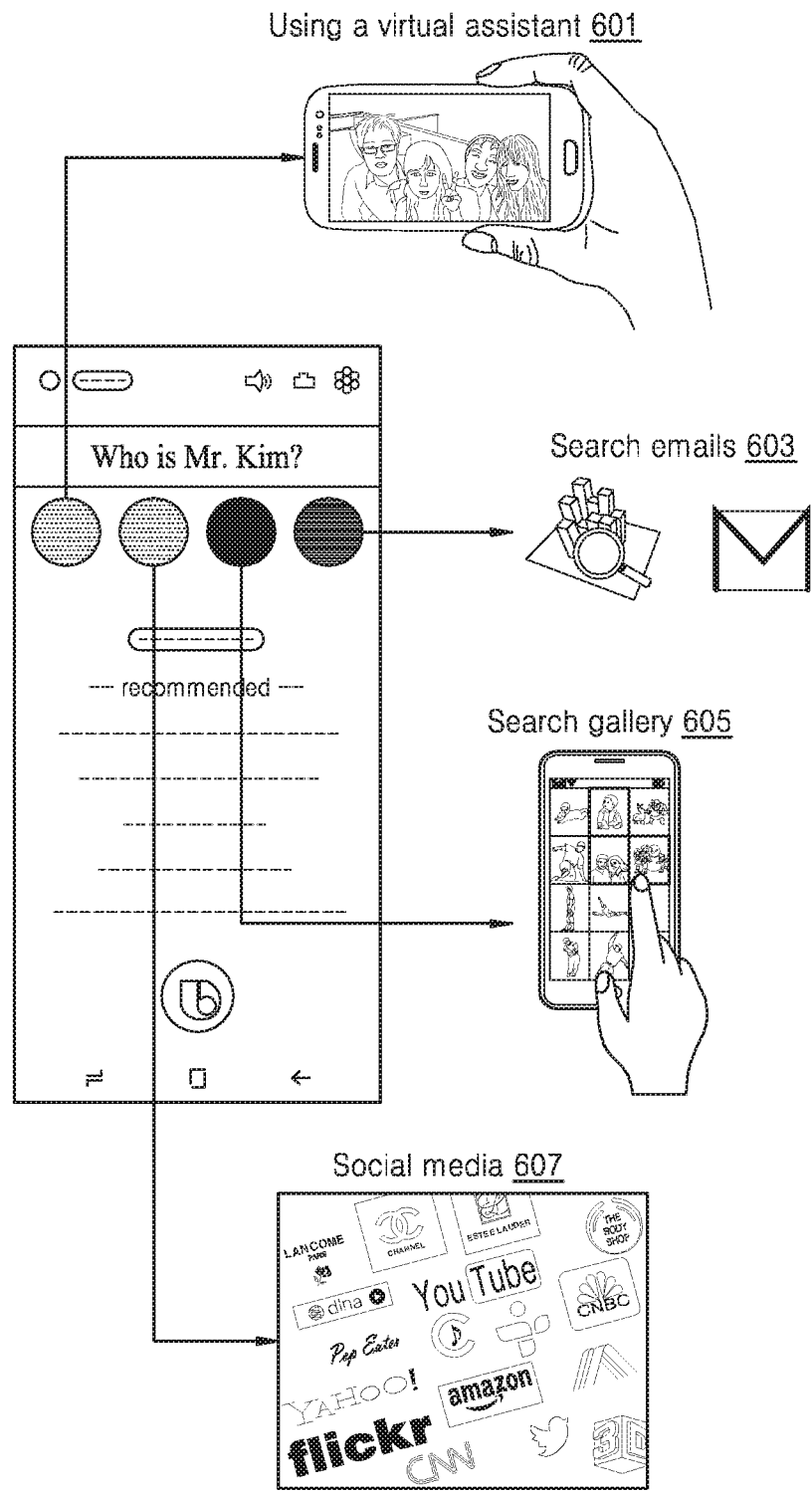
FIG. 6 illustrates an example scenario of solving a problem in which the problem is known but a solution to the problem is unknown according to an embodiment.

FIG. 6 illustrates a use-case scenario of solving a problem in which the problem is known but a solution to the problem is unknown as illustrated in P2 of FIG. 3 according to an embodiment. For example, a user needs to find the solution to the problem which may be, for example, to identify a person in an image. The problem may be input by the combination of a voice input and a touch input, such as touching a face of a person in the image and speaking "who is this person?" to an electronic device such as a smartphone. Thus, the event to be performed is to identify the person in the image. In order to identify the person, a plurality of tasks may be performed. In an embodiment, the tasks may be: determining the person using a virtual assistant 601 such as, for example, Siri, Google Assistant, Alexa, Bixby, Cortana, etc., searching emails 603 (the user may have the contact of the person from which information about the person may be obtained), searching gallery 605 for an image or multimedia application which may include images and videos in which the person may be tagged, and searching social media which may include profile of the person, images and videos in which the person may be tagged, etc. The embodiments include generating a workflow, which comprises workflow nodes. Each workflow node represents a task, which may be performed by an application in order to perform the task. When the user selects the workflow nodes, the respective tasks are triggered. When the respective tasks are completed, the user is able to achieve the objective of identifying the person in the image.

Figure 7:
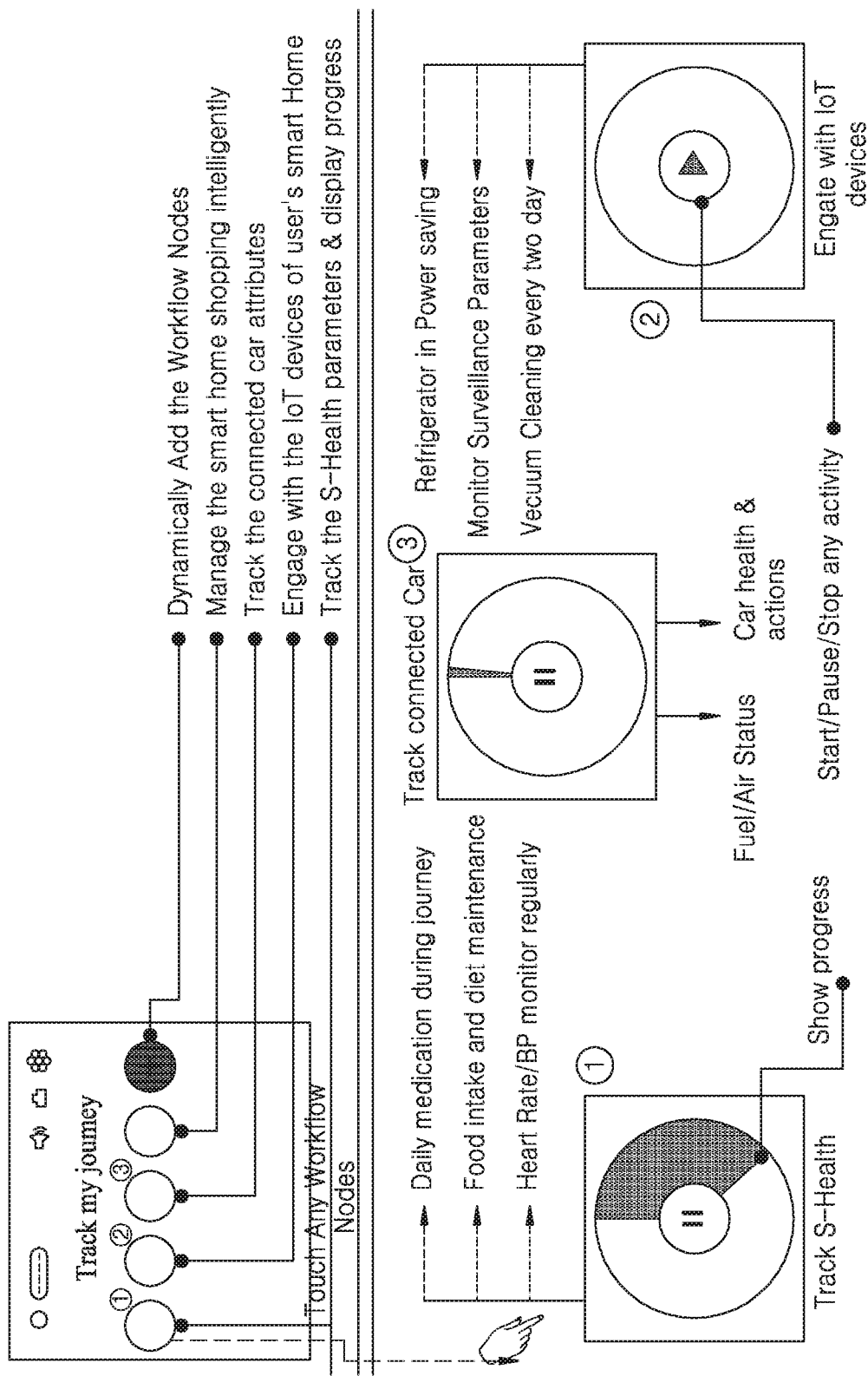
FIG. 7 illustrates an example scenario of solving a problem, where a solution to the problem requires performing a plurality of tasks in sequence or in parallel according to an embodiment.

FIG. 7 illustrates a use-case scenario of solving a problem, where a solution to the problem requires performing of a plurality of tasks in sequence or in parallel as illustrated in P3 of FIG. 3 according to an embodiment. A user may, for example, want to travel and desire to track the journey. In this case, the event may be tracking the journey. A plurality of tasks may be involved in performing the event, with an option of including additional tasks if required or needed.

Referring to FIG. 7, the tasks include managing smart home shopping intelligently where smart home includes a network of connected devices, tracking connected car attributes, engaging with the IoT devices in the smart home of the user, and tracking health parameters of the user and displaying them. Tracking the connected car attributes may include checking the fuel or air status of the car, monitoring the condition of the car and the actions of the car, etc. Engaging with the connected devices in the smart home of the user may include, for example, setting the refrigerator in power save mode, setting security options, performing vacuum cleaning every two days, etc. Tracking health parameters of the user may include reminding a user to take medication during the journey, suggesting food intake and diet, monitoring heart rate and/or blood pressure, etc.

The embodiments may include generating a workflow comprising the plurality of tasks, in order to track the journey. The workflow comprises workflow nodes, where each workflow node allows the user to perform a particular task.

Figure 8:
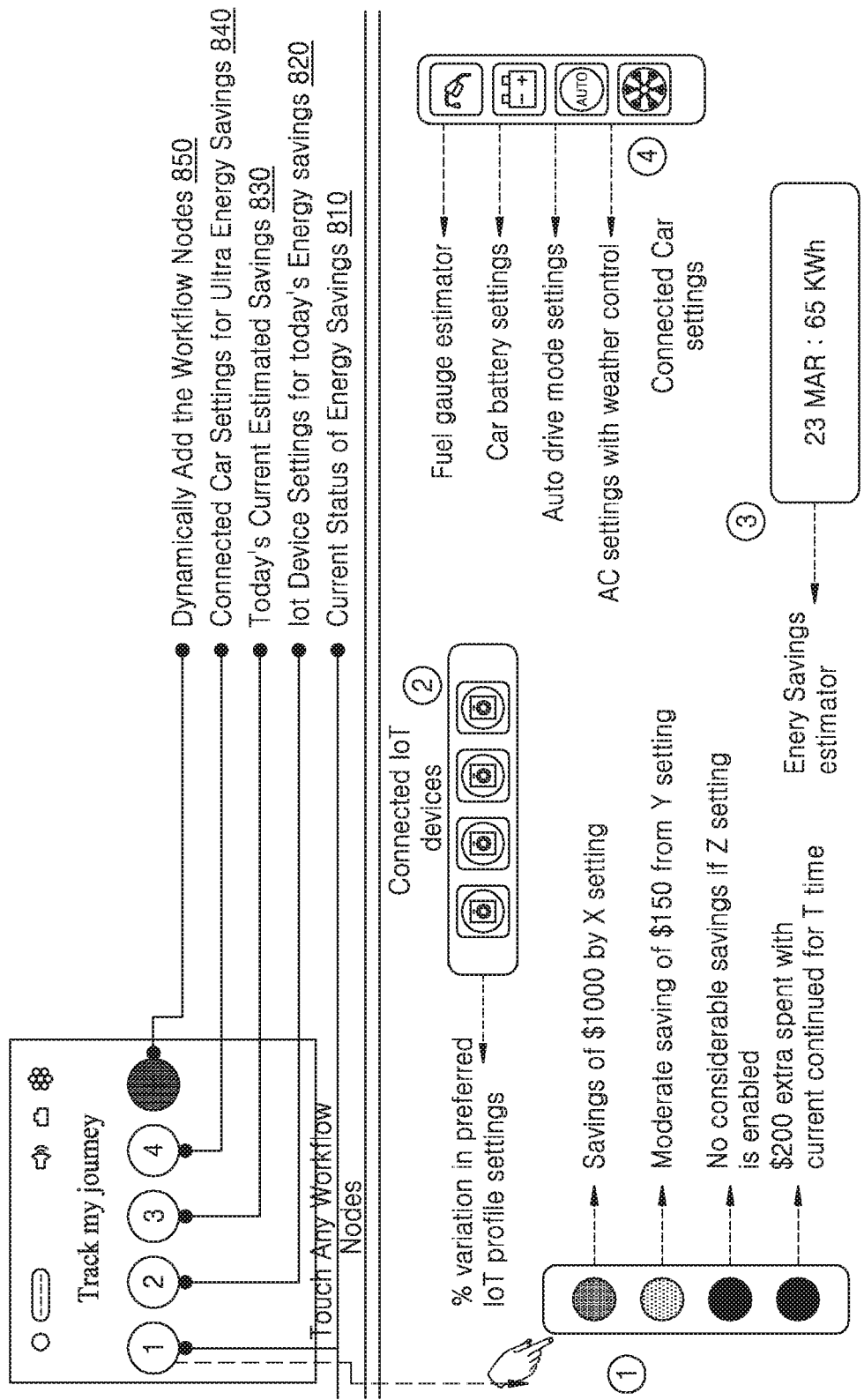
FIG. 8 illustrates an example scenario of solving a problem, wherein solution of the problem requires performing a plurality of tasks in sequence or in parallel according to an embodiment.

FIG. 8 illustrates a use-case scenario of solving a problem, where the solution of the problem requires performing a plurality of tasks in sequence or in parallel as illustrated in P3 of FIG. 3 according to an embodiment. For example, a user may want to update power settings, in order to reduce or minimize energy consumption. The event herein may be reducing or minimizing energy consumption. In order to reduce or minimize the power consumption, a plurality of tasks need to be performed. The embodiments provide an option of including additional sub-tasks. Referring to FIG. 8, the tasks comprise determining a status of energy savings, adjusting power consumption settings of connected devices to reduce consumption of power by the connected devices, determining estimated energy savings, adjusting power consumption settings of a car, etc.

For example, the Current Status of Energy Savings 810 may be determined and selected from the current enabled settings. In response to the selection of one of the workflow nodes, a plurality of sub-nodes may be displayed for further selection or performing at least one sub-task. The settings may be labeled as X setting, Y setting, and Z setting. Based on the current setting, the Current Status of Energy Savings 810 may be determined. If X setting is enabled, then the energy savings may be $1000. If Y setting is enabled, then the energy savings may be $150. If Z setting is enabled, there may not be any considerable energy savings.

If a user touches the workflow node 3 corresponding to Today's Current Estimated Savings 830 on the display of the smartphone, the user may get information of today's estimated energy saving which is 65 kWh as shown in FIG. 8. The other tasks may be performed in a similar way.

The embodiments include generating a workflow comprising the plurality of tasks to be performed in order to perform the event, i.e., update power settings for reducing or minimizing the energy consumption. The workflow comprises workflow nodes, where each workflow node allows the user to perform a particular task to perform the event.

A user may add workflow nodes by touching the icon for Dynamically Add the Workflow Nodes 850 on the display of the smartphone. For example, the workflow node of Connected Car Settings for Ultra Energy Savings 840 may have been added to the previous workflow nodes of Current Status of Energy Savings 810, IoT Device Settings for today's Energy savings 820, and Today's Current Estimation Savings 830 in FIG. 8.

Figure 9:
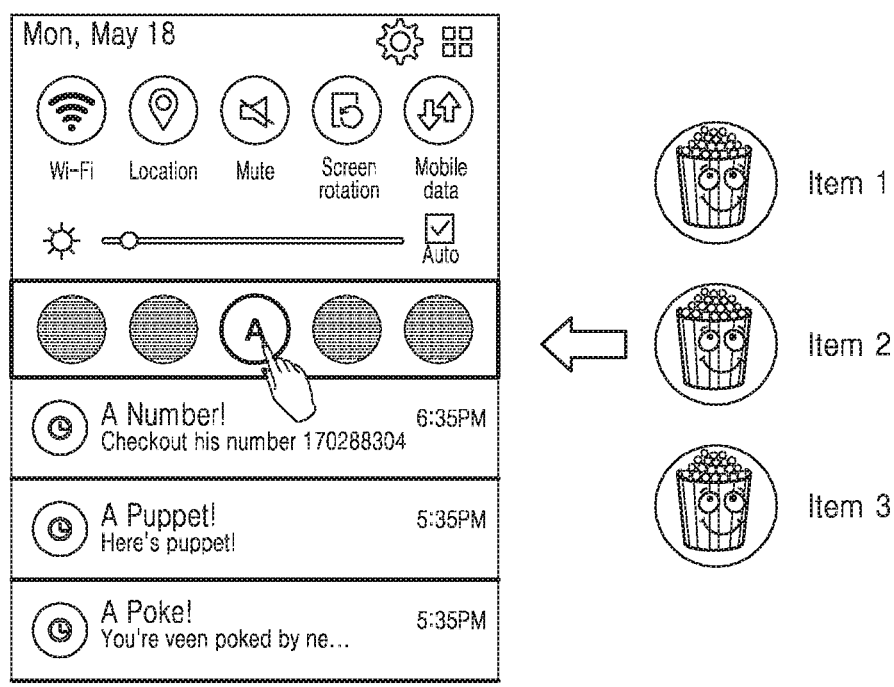
FIG. 9 illustrates the recommendation of at least one alternative task during execution of a workflow according to an embodiment.

FIG. 9 illustrates the recommendation of at least one alternative task during execution of a workflow according to embodiments. Referring to FIG. 9, a user may be able to change the task dynamically, which is to be executed, represented by a node in the workflow. For example, the task A may be placing an order for lunch. If no item, as ordered, is available, then the workflow may be halted. In such circumstances, the user may have an option to dynamically change the task represented in the workflow node A by selecting a new task among the at least one alternative task.

In an embodiment, based on the new task, the workflow may be personalized and a new workflow may be generated. The workflow may be personalized for each user, may be dynamically generated based on the current preference of the user, and may be dynamically modified and updated. Further, to provide the option to select the at least one alternative task, data may be fetched from other applications and solutions. A range of items may be displayed to the user to replace the item which is not available. In other words, based on the user's addition, deletion of at least one node or changing the order of at least one node, the workflow may be rearranged.

Figure 10A:
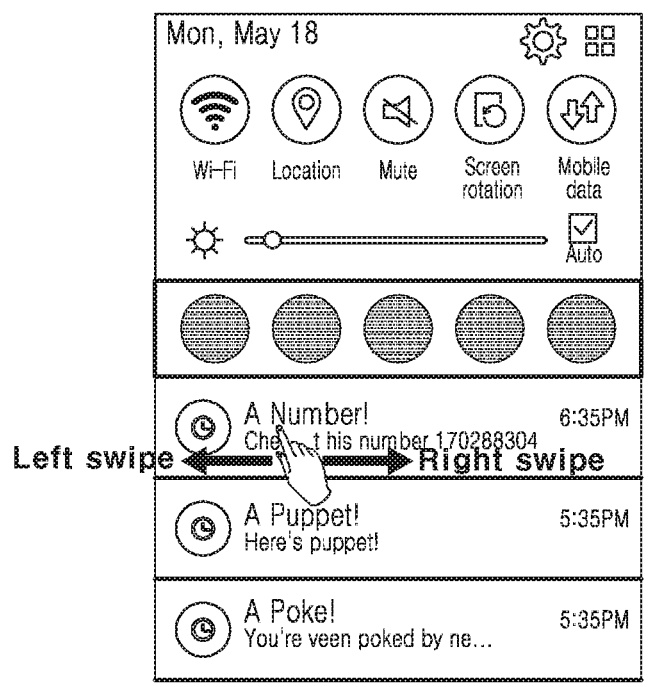
FIGS. 10A, 10B, and 10C illustrate actions that may be performed on an at least one workflow node of a generated dynamic workflow according to an embodiment.
Figure 10B:
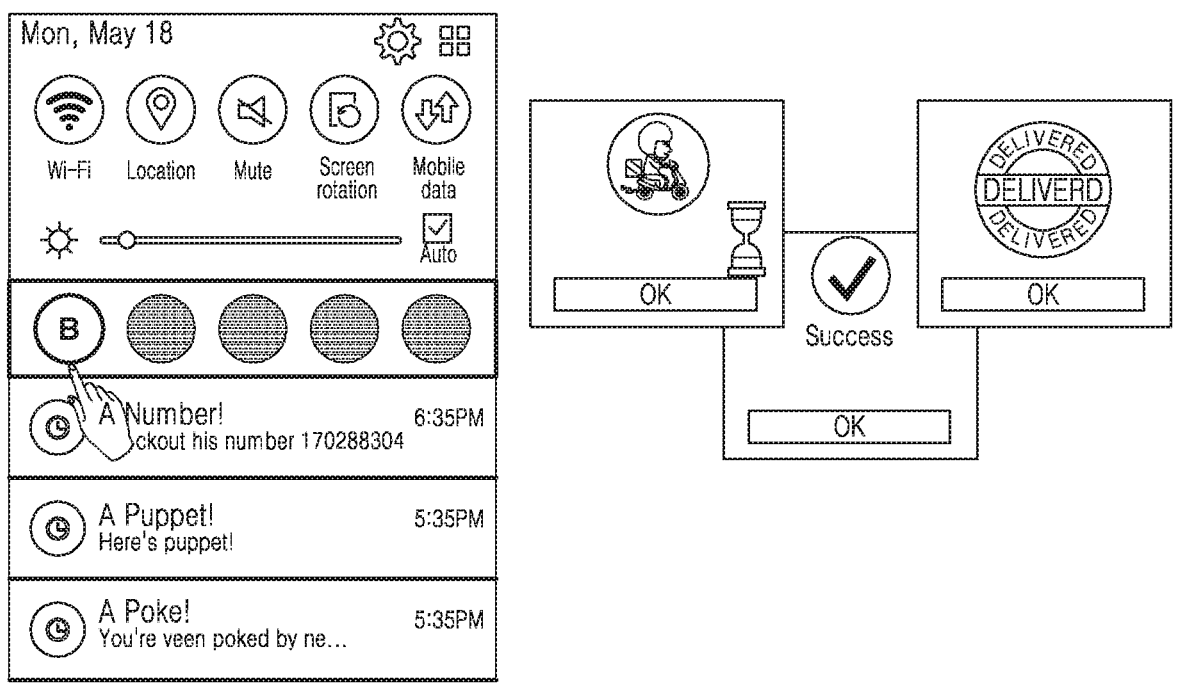
Figure 10C:
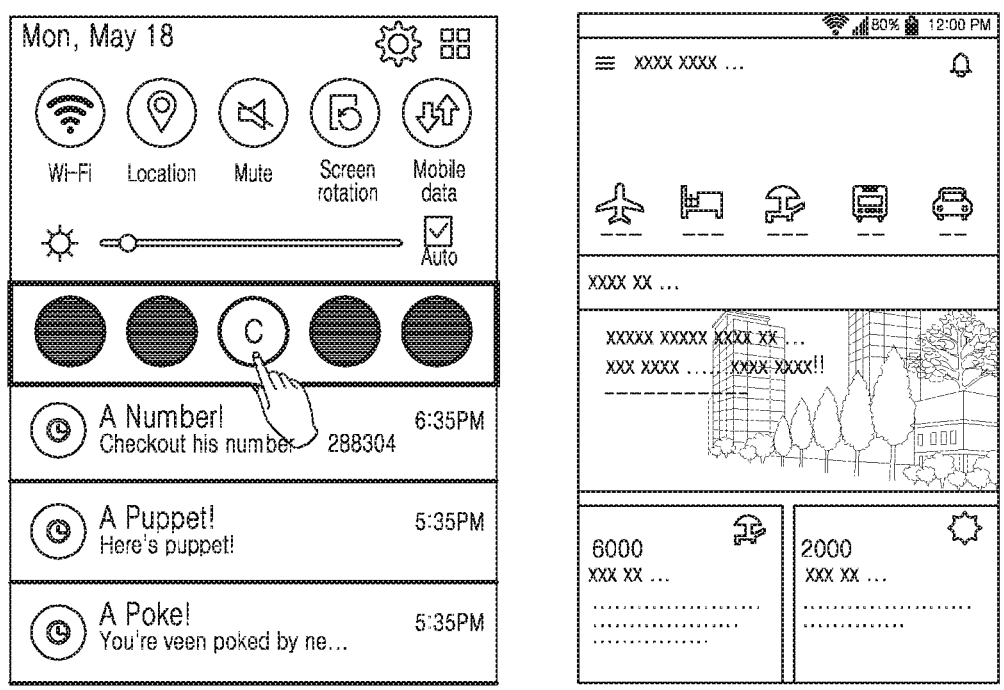

FIGS. 10A, 10B, and 10C illustrate actions that may be performed on at least one workflow node of a generated dynamic workflow according to embodiments. A user may make gesture inputs on at least one workflow node in the generated dynamic workflow such as swipe left, swipe right, hover, click, etc. The gesture inputs may cause performance of at least one action which may influence at least one task in at least one workflow node in the dynamic workflow.

Referring to FIG. 10A, a user may make a left swipe gesture input on a workflow node to cancel a task represented by the workflow node. The user may cancel a complete set of notifications by performing the left swipe gesture. This may provide an enhanced user experience as the user may cancel a group of notifications at once.

In another embodiment, as shown in FIG. 10A, the user may perform a right swipe gesture to add, for example, reminders to a set of tasks presented on a workflow to a planner. In an example, the user may set a reminder of at least one of a trip booked through a website, an office meeting, etc. By performing a right swipe gesture, a plurality of events may be added to the planner.

Referring to FIG. 10B, the user may perform a hover gesture over a workflow node B to view additional information about a task represented by the workflow node B.

Referring to FIG. 10C, the user may perform a click gesture on a workflow node C to view the task to be executed by the workflow node C. The user may view an application, which may perform the task represented by the workflow node C, by performing the click gesture.

Figure 11:
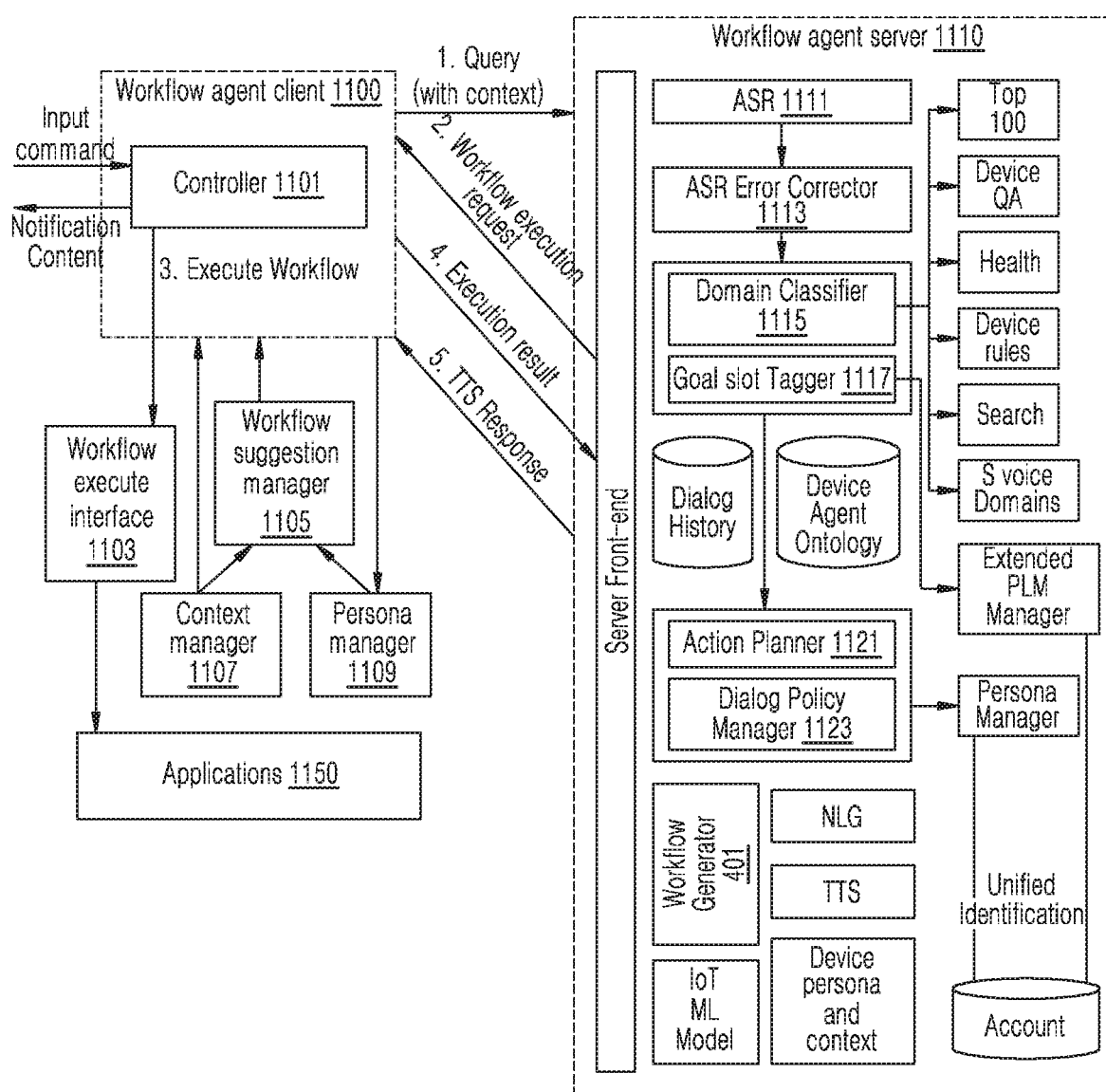
FIG. 11 illustrates architecture for generating a workflow of tasks according to an embodiment.

FIG. 11 illustrates architecture for generating a workflow of tasks, according to an embodiment. The architecture is based on a device such as workflow agent client 1100 and a workflow agent server 1110. The workflow agent client 1101 may be an environment consisting of a plurality of devices, where all of the plurality of devices are connected to each other. The workflow agent client 1100 may receive an input command for initiating workflow generation either in the form of an input command or from a triggered notification. For instance, the workflow agent client 1100 may be an IoT device which is in an IoT environment consisting of other IoT devices. The workflow agent client 1100 may deliver the input command, from the user such as a voice command or from a message, to the workflow agent server 1110. The workflow agent client 1100 may display the generated workflow and may control the workflow.

A controller 1101 included in the workflow agent client 1100 may receive the input command, which may be, a voice command from a user, a query obtained either from a notification or gestures, etc. The workflow agent client 1100 may transmit the input command to the workflow agent server 1110. The speech (voice command) may be converted to text using automatic speech recognition (ASR), if the input command is by a voice input, and provides the query to all the relevant modules. The workflow agent server 1110 may contact all the modules, for example, the intelligent platform 410, the cloud platform 420 and the IoT platform 430, to generate the workflow, as shown in FIG. 4, and provide the workflow details such as the type of workflow, number of workflow nodes, and so on to the workflow agent client 1100.

The workflow agent server 1110 may include a domain classifier 1115 to determine whether the input command may be classified into at least one of the categories such as favorites, which may be a query used frequently by a user, device quality assurance (QA), health domain related queries for the user, device rules, etc. The action planner 1121 may accumulate information about the input command and the category of the input command to provide an action plan to the workflow generator 401. The workflow generator 401 selects tasks from the different modules, which are relevant to perform an event. The event, to be performed, is directed by a user through the input command or notification trigger. The tasks selected from the different modules are represented by workflow nodes, which constitute the generated workflow. The generated workflow is provided to the controller 1101. The controller 1101 may provide the workflow to a workflow execute interface 1103 to execute the workflow. The workflow is executed by executing the tasks, represented by the workflow nodes, through the associated applications 1150. The workflow execute interface 1103 includes displaying the workflow on the workflow agent client 1100. A workflow suggestion manager 1105 may allow dynamic update of the workflow nodes of the generated workflow based on actions and gestures performed by the user on the workflow nodes. The provide workflow suggestion manager 1105 may provide feedback to the workflow agent server 1110 if required. The controller 1101 and the workflow suggestion manager 1105 may be implemented as at least one hardware processor. The workflow execute interface 1103 may comprise a display which displays the workflow on the workflow agent client 1100.

In an embodiment, the workflow agent client 1101 and workflow agent server 1102 may be integrated, and their respective functionalities may be carried out using a single device.

Figure 12:
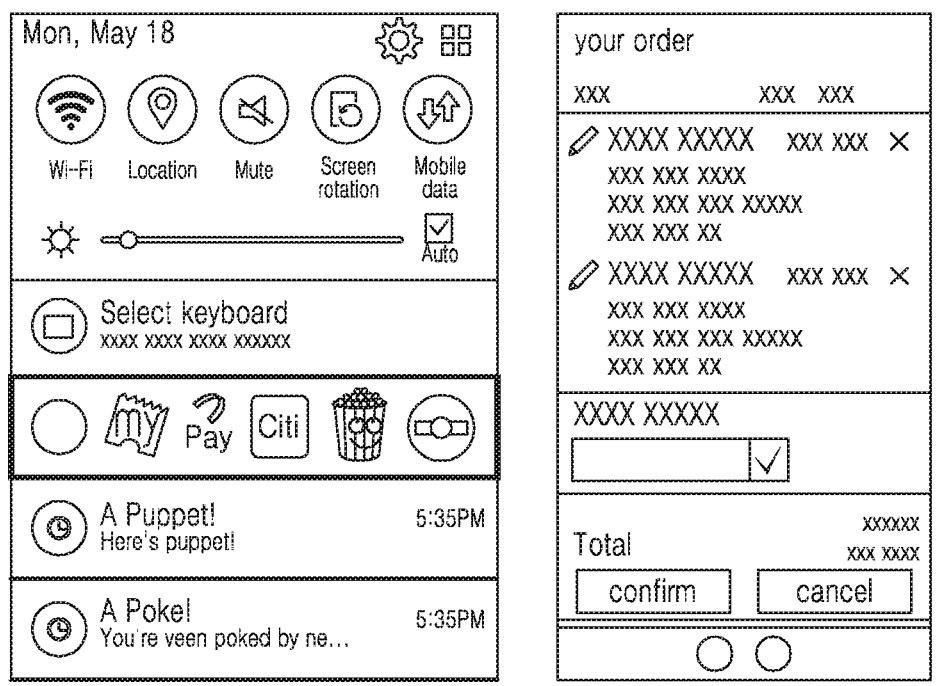
FIG. 12 illustrates an example scenario of workflow generation for movie ticket booking according to an embodiment.

FIG. 12 illustrates a use case scenario of workflow generation for movie ticket booking according to an embodiment. Referring to FIG. 12, a workflow is generated and displayed. The objective of the workflow herein is to book a movie ticket. To perform the event of booking a movie ticket, at least five tasks or actions including some optional tasks or actions need to be performed, for example, booking seats at a particular date and time, providing an interface for payment, bank authentication, ordering food (optional), and booking a taxi (optional). The tasks or actions may be performed by different applications. The embodiments generate a workflow, which includes six workflow nodes, in which the first workflow node specifies the type of the workflow, and each of the remaining workflow nodes represent an application performing a task to perform the overall event, for example, booking the movie ticket.

Figure 13:
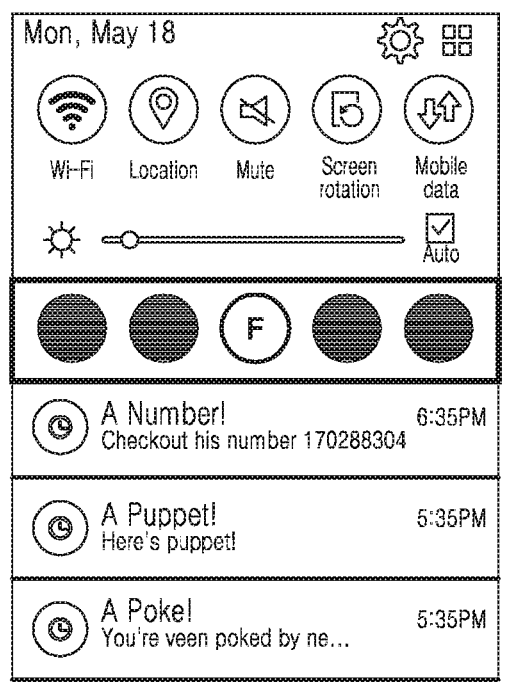
FIG. 13 illustrates an example scenario of workflow generation for booking a holiday according to an embodiment.

FIG. 13 illustrates a use case scenario of workflow generation for booking a holiday according to an embodiment. The objective herein is to book a holiday. The event requires performing at least five tasks, for example, providing an interface for flight booking, booking a hotel, arranging a foreign exchange, shopping for attire, and booking a taxi during holidays. The embodiments generate a workflow comprising five workflow nodes, each performing each task. The workflow node F in FIG. 12 represents arranging the foreign exchange. If a vendor, designated for arranging the foreign exchange, is not able to provide foreign exchange, options for selecting alternative vendors for obtaining foreign exchange may be provided.

Figure 14:
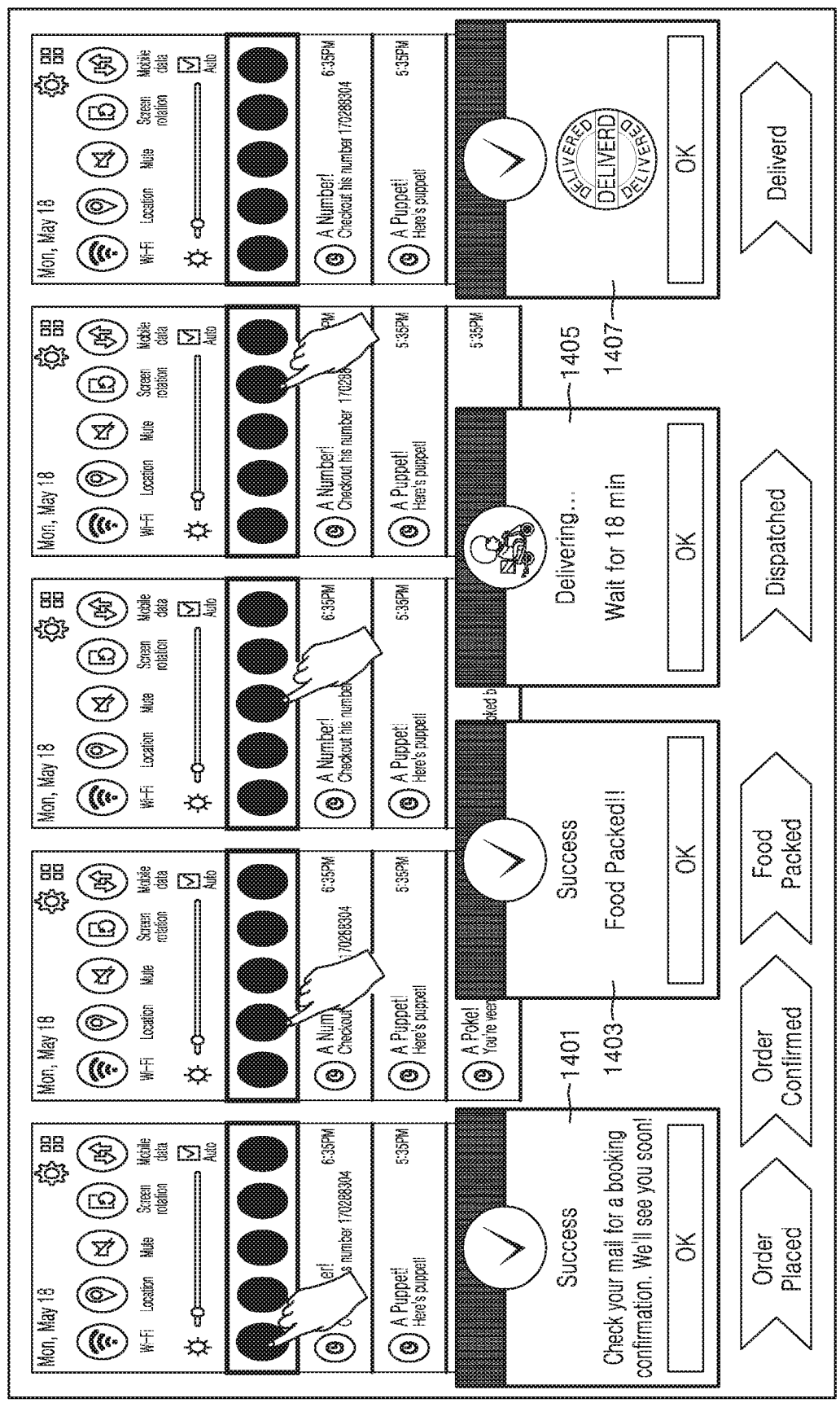
FIG. 14 illustrates an example scenario of workflow generation for ordering food according to an embodiment.

FIG. 14 illustrates a use case scenario of workflow generation for ordering food according to an embodiment. Referring to FIG. 14, embodiments include generating a workflow comprising of workflow nodes for executing tasks in order to perform the event, for example, ordering food. The tasks include placing an order, confirming the order 1401, packing the food 1403, dispatching the food 1405, and delivering the food 1407. The embodiment provides generating a workflow comprising at least one workflow node, each representing a task. Executing all the tasks represented by all the workflow nodes may lead to completing the event.

Figure 15:
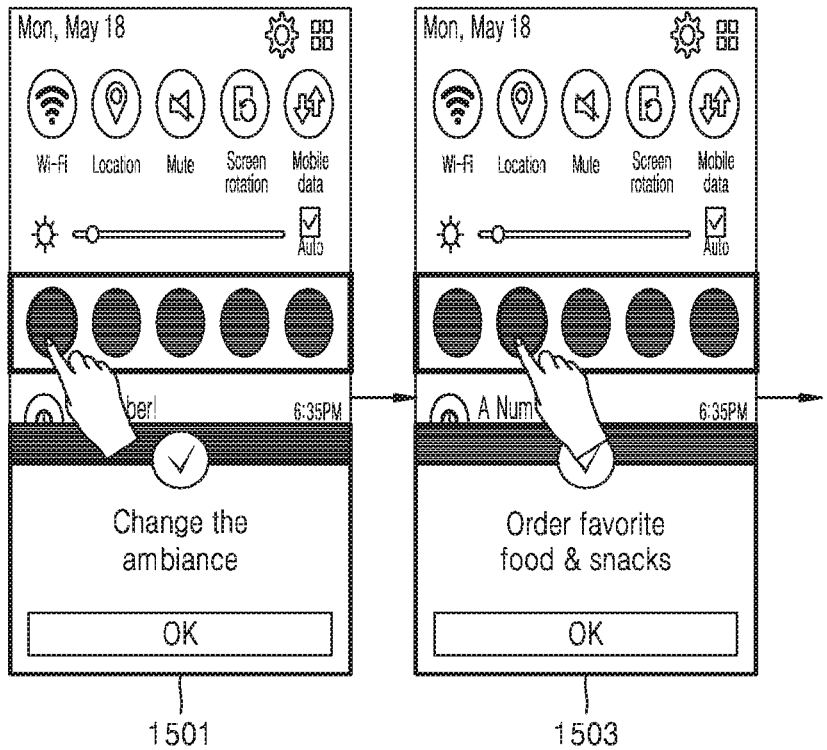
FIG. 15 illustrates an example scenario of workflow generation for a query by a user to rearrange ambiance of a house for a gathering of friends according to an embodiment.
Figure 15:
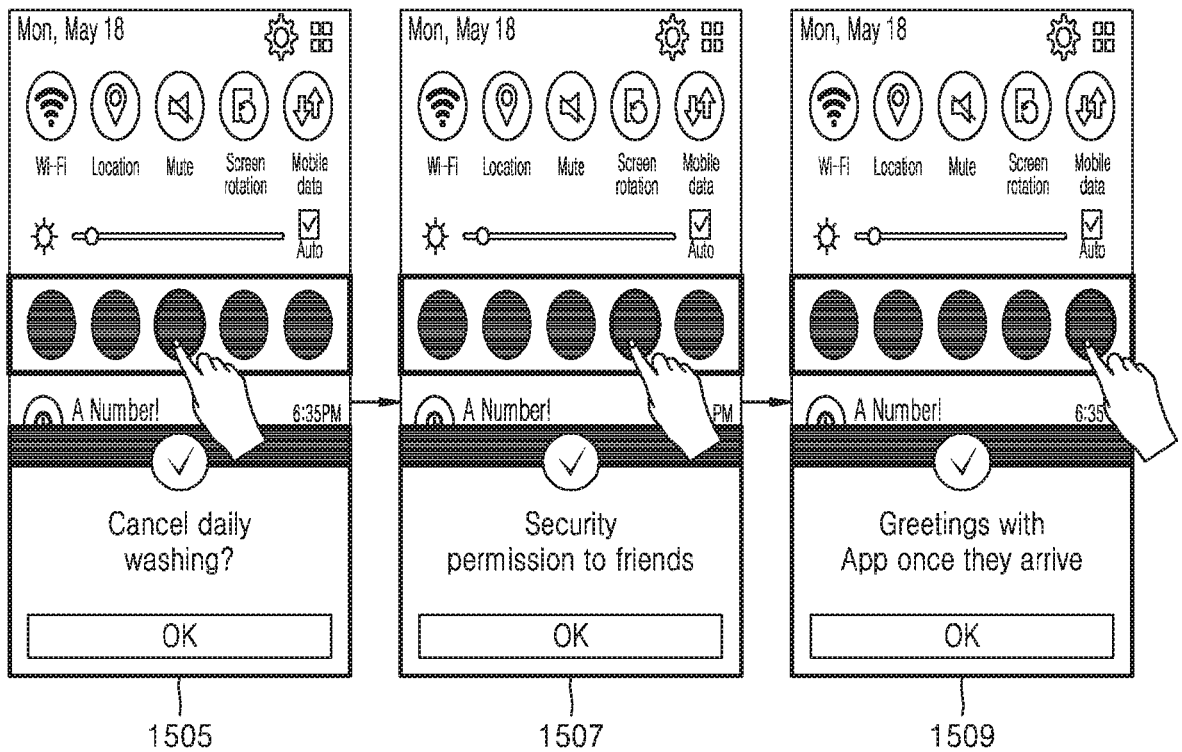

FIG. 15 illustrates a use case scenario of workflow generation for a query by a user to rearrange ambiance of a house for a gathering of friends according to an embodiment. The embodiment includes providing recommendations on a user interface, based on the query of the user to rearrange the ambiance of the house for the gathering of friends. In order to rearrange the ambiance of the house, a plurality of tasks need to be performed by a plurality of devices, which are connected to each other. In an embodiment, friends of the user may be identified by collecting a list of friends from messages, mails, social media, etc. The preferences of the friends are thereafter gathered based on, for example, a number of communications with the user, user's best friend indication on social media, how recently the user communicated, etc. A workflow of tasks may be generated in which the first workflow node represents the task of changing the daily mode ambiance of the house to that of the preference of the identified friends 1501. The second workflow node represents the task of ordering favorite foods and snack for the friends gathering 1503. In an embodiment, the user may order the missing items in a refrigerator where the refrigerator is one of the plurality of connected devices which the identified friends may prefer to have when they visit the house. The third workflow node represents the task of postponing schedule of a washing machine where the washing machine is one of the plurality of connected devices or suspending/performing any cleaning activity 1505. The fourth workflow node represents the task of providing a display to the identified friends, which provides security permission to the identified friends to gain access to the house based on credentials of the identified friends 1507. The fifth workflow node represents the task of providing a greeting, providing recommendations of drinks and other food items in the fridge, and providing recommendations of television programs 1509 where the television is one of the plurality of connected devices.

Figure 16:
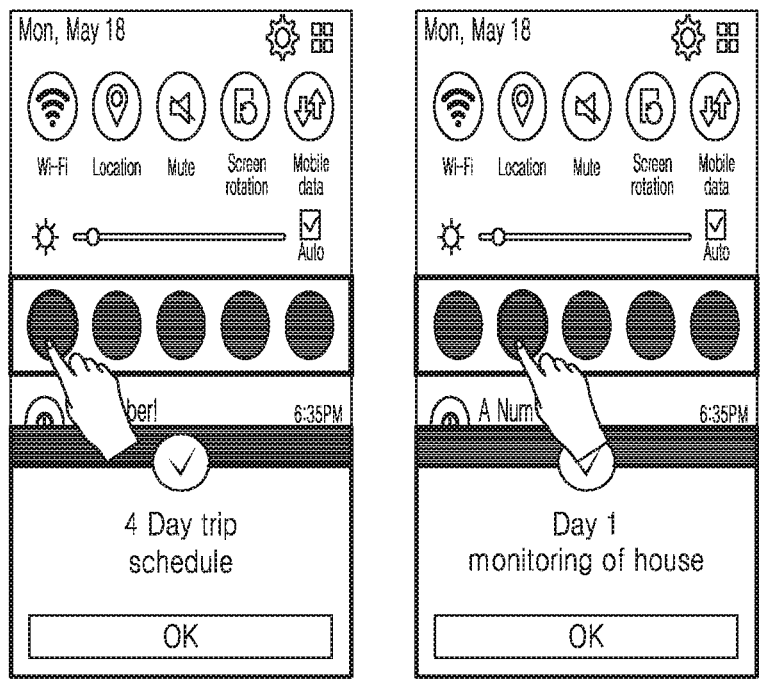
FIG. 16 illustrates an example scenario of workflow generation for a query by the user to rearrange the households of a house for a few days according to an embodiment.
Figure 16:
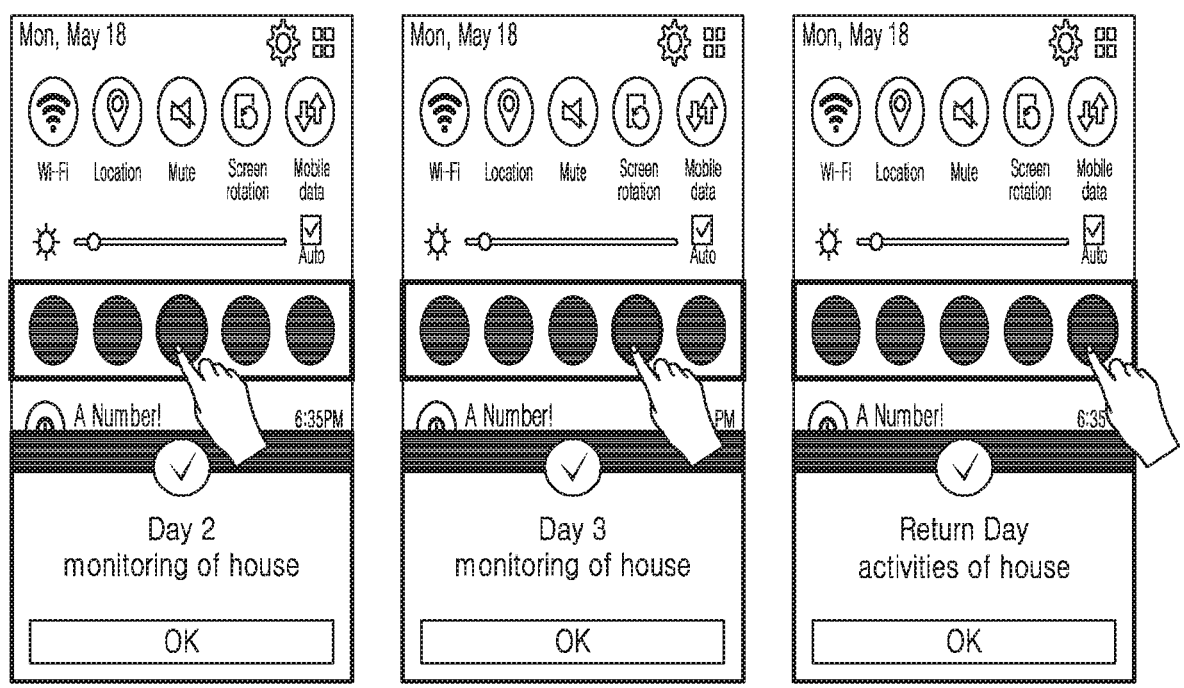

FIG. 16 illustrates a use case scenario of workflow generation for a query by the user to rearrange the households of a house for a few days according to an embodiment. The actions corresponding to the workflows nodes may be performed differently on a periodic basis. For example, the occupants of a house may be away from the house for four days. The house may consist of a plurality of devices, which may interact with each other to achieve the desired objective. The plurality of devices may be IoT devices connected to each other in an IoT environment. The IoT devices in the house may be a smart camera for surveillance of the house, a smart cleaner for cleaning the house, a smart refrigerator, a smart air conditioner, etc. The user may have a smartphone with an installed application for ordering food and recharging. In order to rearrange the households, the IoT devices need to perform respective tasks allocated to them. The embodiments may include generating a workflow, with workflow nodes, where each of the workflow nodes represents tasks to be performed by each IoT device. The user may provide an input command and the workflow may be generated. The following table depicts an example of the individual tasks represented by workflow nodes to be performed by each of the IoT devices during the four days.

TABLE 1

| Day | Surveillance | Cleaning | Refrigerator | Air condition | Food order | Recharge |
|---|---|---|---|---|---|---|
| 1 | Always on | Perform | ON | OFF | NO | NO |
| 2 | Always on | OFF | Power saving | OFF | NO | NO |
| 3 | Always on | OFF | Power saving | OFF | NO | NO |
| 4 | Always on | Perform | ON | ON | YES | YES |

The embodiments disclosed herein may be implemented through at least one software program running on at least one hardware device and performing network management functions to control the network elements. The network elements shown in FIGS. 4 through 11 include blocks, which may be at least one of a hardware device or a combination of hardware device and software module.

The embodiments disclosed herein may be applied in most of the connected ecosystem such as smart home, smart building, smart city, e-commerce, virtual reality, augmented reality, etc., and other connected systems, where the sequence of events may or may not be related to one another and may or may not influence the state of the other events.

The embodiments disclosed herein describe a method and system for enhancing user experiences by generating a dynamic workflow of tasks. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in, for example, very high speed integrated circuit hardware description language (VHDL) another programming language, or implemented by one or more VHDL or several software modules being executed on at least one hardware device. The hardware device may be any kind of portable device that may be programmed. The device may also include means, which could be e.g. hardware means like e.g. an application specific integrated circuit (ASIC), or a combination of hardware and software means, e.g. an ASIC and a field programmable gate array (FPGA), or at least one microprocessor and at least one memory with software modules located therein. The method embodiments described herein could be implemented partly in hardware and partly in software. Alternatively, the invention may be implemented on different hardware devices, e.g. using a plurality of central processing units (CPUs).

While embodiments of the present disclosure have been shown and described, it would be appreciated by those skilled in the art that changes may be made without departing from the principles and spirit of the disclosure, the scope of which is defined in the claims and their equivalents.

What is claimed is:

1. A method comprising:
    receiving, by a mobile device, an input, the input comprising at least one of: a voice command received by the mobile device, a text message input into the mobile device, a text message received by the mobile device, a notification in the mobile device, or a gesture input;
    extracting, by the mobile device, one or more keywords from the received input;
    identifying, by the mobile device, an objective to be completed based on the one or more extracted keywords;
    selecting, by the mobile device, from among a plurality of tasks, at least one task represented by at least one workflow node that is relevant to the identified objective, each of the plurality of tasks corresponding to at least one application of the mobile device or a smart device;
    generating, by the mobile device, workflow information that includes the selected at least one task that is relevant to the identified objective; and
    displaying, by the mobile device, information related to the generated workflow information, wherein one of the at least one workflow node is displayed on the mobile device, and the one of the at least one workflow node represents a particular task that is to be performed on the mobile device or in conjunction with the smart device, which is a supporting device.

2. The method of claim 1, wherein the displaying includes displaying information regarding the at least one workflow node on a display of the mobile device.

3. The method of claim 1, further comprising: rearranging the workflow information based on a user's input to at least one of: add, delete, or change an order of a selected node of the workflow information.

4. The method of claim 1, wherein
    the displayed information includes information regarding the at least one workflow node, and
    the method further comprises:
        selecting a workflow node from among the at least one workflow node based on receiving an initiation input of a user; and
        performing an action corresponding to the workflow information sequentially, by an application installed in, operated in, or connected to the mobile device, based on the selected workflow node.

5. The method of claim 1, further comprising:
    receiving an initiation input for the displayed information related to the generated workflow information by a user; and
    performing an action corresponding to the workflow information sequentially based on the initiation input for the workflow information.

6. The method of claim 1, wherein the input is received from a network outside of the mobile device.

7. The method of claim 4, wherein the performing of the action comprises performing a different action on a periodic basis.

8. The method of claim 4, further comprising: displaying at least one notification corresponding to the action based on the selecting of the selected workflow node.

9. The method of claim 4, wherein the performing the action comprises:
    displaying at least two sub-nodes included in the selected workflow node based on the selecting the workflow node: and
    performing a sub-action corresponding to one of the at least two sub-nodes based on a selection of the one of the at least two sub-nodes.

10. A mobile device comprising:
    a display; and
    at least one processor configured to:
        receive an input, the input comprising at least one of: a voice command received by the mobile device, a text message input into the mobile device, a text message received by the mobile device, a notification in the mobile device, or a gesture input;

extract one or more keywords from the received input;

identify an objective to be completed based on the one or more extracted keywords;

select, from among a plurality of tasks, at least one task represented by at least one workflow node that is relevant to the identified objective, each of the plurality of tasks corresponding to at least one application or a smart device;

generate workflow information that includes the selected at least one task that is relevant to the identified objective; and cause the display of the mobile device to display information related to the generated workflow information, wherein one of the at least one workflow node is displayed on the mobile device, and the one of the at least one workflow node represents a particular task that is to be performed on the mobile device or in conjunction with the smart device, which is a supporting device.

11. The mobile device of claim 10, wherein the displayed information includes information regarding the at least one workflow node.

12. The mobile device of claim 10, wherein the at least one processor is further configured to rearrange the workflow information based on a user's input to at least one of add, delete, or change an order of a selected node of the workflow information.

13. The mobile device of claim 10, wherein the displayed information includes information regarding the at least one workflow node; and the at least one processor is further configured to:

select a workflow node from among the at least one workflow node based on receiving an initiation input of a user; and perform an action corresponding to the workflow information sequentially, by an application installed in, operated in, or connected to the mobile device, based on the selected node.

14. The mobile device of claim 10, wherein the at least one processor is further configured to:

receive an initiation input for the displayed information related to the generated workflow information by a user; and perform an action corresponding to the workflow information sequentially based on the initiation input for the workflow information.

15. The mobile device of claim 13, wherein the performing of the action comprises performing a different action on a periodic basis.

16. The mobile device of claim 13, wherein the display is further configured to display at least one notification corresponding to the action based on the selected workflow node.

17. The mobile device apparatus of claim 13, wherein the displayed information includes at least two sub-nodes included in the selected workflow node based on the selecting the workflow node, and the performing of the action comprises performing a sub-action corresponding to one of the at least two sub-nodes based on a selection of the one of the at least two sub-nodes.

18. A non-transitory computer program product comprising a computer readable storage medium having a computer readable program stored therein, the computer readable program, when executed by a mobile device, causes the mobile device to:

receive an input, the input comprising at least one of: a voice command received by the mobile device, a text message input into the mobile device, a text message received by the mobile device, a notification in the mobile device, or a gesture input;

extract one or more keywords from the received input;

identify an objective to be completed based on the one or more extracted keywords;

select, from among a plurality of tasks, at least one task represented by at least one workflow node that is relevant to the identified objective, each of the plurality of tasks corresponding to at least one application of the mobile device or a smart device;

generate workflow information that includes the selected at least one task that is relevant to the identified objective; and cause a display of the mobile device to display information related to the generated workflow information, wherein one of the at least one workflow node is displayed on the mobile device, and the one of the at least one workflow node represents a particular task that is to be performed on the mobile device or in conjunction with the smart device, which is a supporting device.

* * * * *